July 30, 1968 R. K. WEEMAN 3,395,336
CALIBRATED VARIABLE IMPEDANCE NETWORK
Filed Nov. 2, 1965
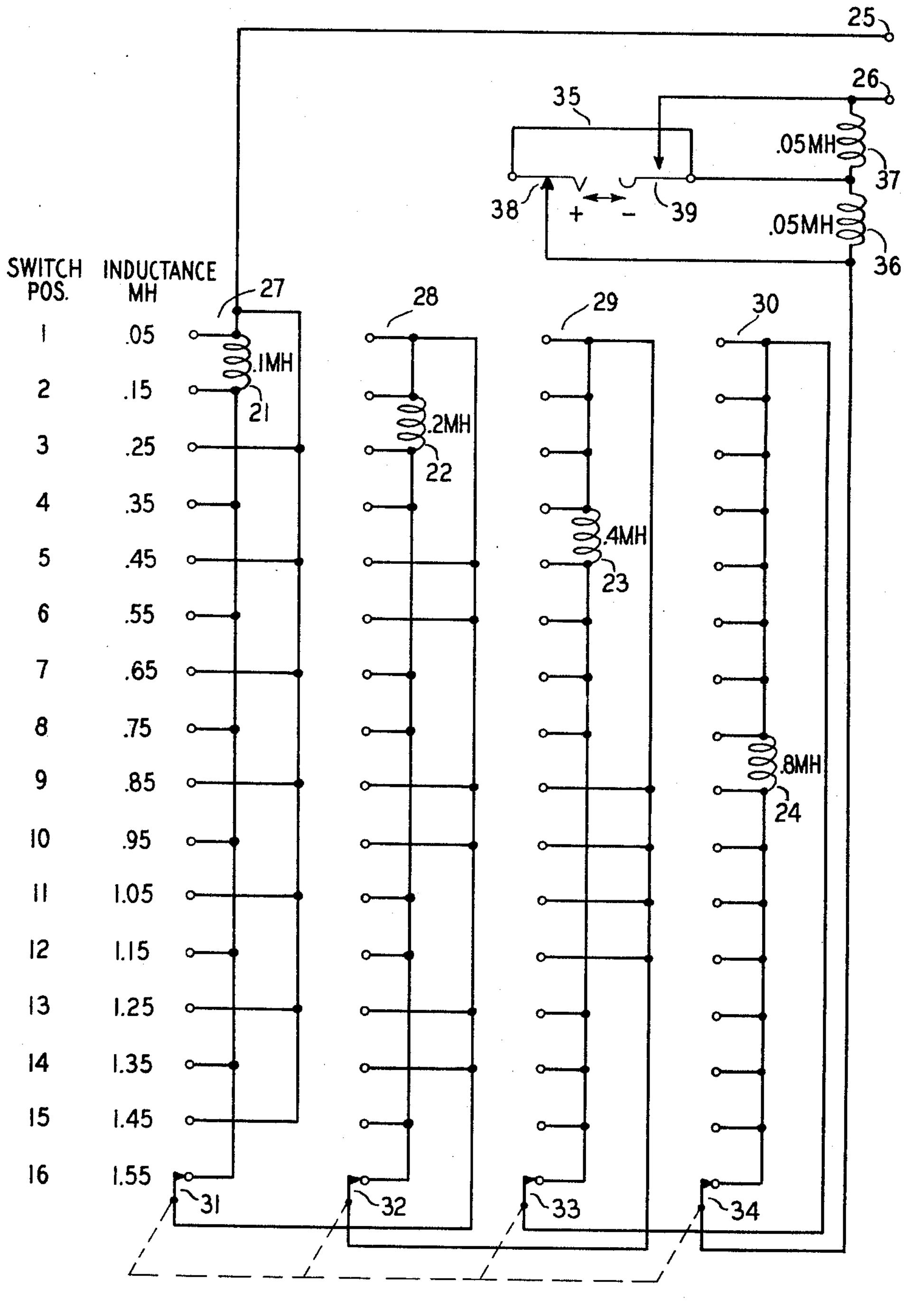
INVENTOR
R. K. WEEMAN
BY R. B. Anderson
ATTORNEY United States Patent Office 3,395,336
Patented July 30, 1968

3,395,336

CALIBRATED VARIABLE IMPEDANCE NETWORK

Roland K. Weeman, Atkinson, N.H., assignor to Bell Telephone Laboratories, Incorporated, New York, N.Y., a corporation of New York Filed Nov. 2, 1965, Ser. No. 506,059
2 Claims. (Cl. 323—80)

ABSTRACT OF THE DISCLOSURE

A calibrated impedance network variable in steps is disclosed. It comprises a multiple section ganged switch and individual impedance elements equal in number to the number of switch sections. The impedance elements are related to one another in impedance values by powers of two and the switch sections are wired so that different switch settings combine the impedance elements in different series combinations to produce an impedance which is variable over a wide range in steps equal to the impedance value of the smallest impedance element.

This invention relates generally to variable impedance networks and more particularly to impedance networks which are variable in accurately calibrated steps over a predetermined range of values.

When measuring or testing the properties of electrical apparatus or when aligning or adjusting electrical signal transmission systems, it is frequently necessary to employ an accurately calibrated variable impedance device as an impedance standard. When such an impedance device is variable in steps over a predetermined range, all steps need to be calibrated with comparable precision if the same accuracy is to be obtained in all portions of the range. Because this normally requires the precise calibration of a relatively large number of individual impedance elements, such variable impedance devices tend to be somewhat costly.

An object of the present invention is to reduce the cost of a calibrated variable impedance device without sacrificing accuracy in any portion of its range.

Another and more particular object is to reduce the number of individual impedance elements that need to be calibrated in a variable impedance device without reducing either the range over which the impedance can be varied or the number of steps in the range.

Still another object of the invention is to permit a calibrated impedance device which is variable in steps to be adjusted to its final desired setting in as quick and convenient a manner as possible.

In accordance with one feature of the invention, a calibrated impedance is made up of a plurality of individually calibrated impedance elements related to one another in impedance by ascending powers of two and a multiple-section multicontact ganged switch having the same plurality of sections. A calibrated impedance element is associated with each switch section and the switch sections are wired so that different switch settings combine the impedance elements in different series combinations to produce a total impedance which is variable over a wide range in steps no larger than the impedance of the smallest impedance element. The number of steps provided is equal to two raised to a power fixed by the number of switch sections or individual impedance elements. Thus, an eight-step variable impedance may be provided by a network using only three switch sections and three individually calibrated impedance elements or a sixteen-step variable impedance may be provided by a network using only four switch sections and four individually calibrated impedance elements.

More specifically, in accordance with this feature of the invention, the calibrated impedance network is made up of a ganged multiposition switch having $n$ sections of $2^n$ contacts each and a contact arm for each section and a respective calibrated impedance element having an impedance value of $2^{(m-1)}Z$ associated with each section, where $n$ is an integer greater than unity, $m$ is an integer which progresses from one through $n$ in successive switch sections, and Z is the incremental unit of impedance between steps. In each switch section, alternate groups of $2^{(m-1)}$ contacts are connected together and the calibrated impedance element is connected between two successive groups of contacts. The contact arm of each switch section but the last is connected to the first contact of the next switch section, the first contact of the first switch section is connected to one external terminal, and the contact arm of the last switch section is connected to another external terminal. In operation, the network presents between the two external terminals a calibrated impedance variable in steps of Z over a range of $(2^n-1)Z$. Since only in individually calibrated impedance elements are used, a high degree of precision is obtained at a minimum of cost.

In accordance with another feature of the invention, the incremental unit of impedance between steps may be reduced still further with no loss of precision, at a minimum of additional cost, and in a manner permitting maximum speed and convenience in adjusting the variable impedance device to its final desired setting. A pair of auxiliary calibrated impedance elements having respective impedance values of $Z/2$ are connected in series between the multiposition switch and one of the two external terminals and a three-position key is provided which shorts out one of the auxiliary impedances in its neutral position, shorts out both of the auxiliary impedances in one extreme position, and shorts out neither of the auxiliary impedances in the other extreme position. The key circuit thus adds an impedance of $Z/2$ to the total when the key is in its neutral position, deletes that impedance when the key is in one extreme position, and adds an impedance of Z when the key is in the other extreme position. A rapid approximation of the final setting of the impedance device may thus be reached by setting the multiple-contact ganged switch, with final accuracy obtainable by setting the key to one of its three positions.

A more complete understanding of the invention and its several objects and features may be obtained from a study of the following detailed description of a specific embodiment.

The single figure of the drawing illustrates a specific embodiment of the invention in the form of a sixteen-step variable inductance with provision for halving the size of each step during final adjustment. As shown, the variable inductance is a network which includes four individually calibrated inductors 21, 22, 23, and 24, a pair of external terminals 25 and 26, and a multi-contact ganged switch made up of four identical sections 27, 28, 29, and 30. Inductors 21, 22, 23, and 24 have inductance values of 0.1 millihenry, 0.2 millihenry, 0.4 millihenry, and 0.8 millihenry respectively, and each switch section contains at least sixteen contacts or switch positions. For clarity, these contacts are shown in vertical alignment, with the first switch position or contact at the top of each section and the last or sixteenth at the bottom. In practice, of course, the contacts may be arranged in any convenient fashion, such as around the periphery of respective rotary switch sections. Of the various switch sections, the first section 27 has a contact arm 31, the second section 28 has a contact arm 32, the third section 29 has a contact arm 33, and the fourth or last section 30 has a contact arm 34. As illustrated, all four contact arms are ganged together so that they make contact with like numbered switch positions or contacts simultaneously in all four switch sections.

In accordance with an important feature of the invention, alternate groups of $2^{(m-1)}$ switch positions or contacts are connected together in each switch section, where $m$ is equal to unity in the first section 27 and progresses through the integers 2 and 3 in respective second and third sections 28 and 29 to the integer 4 in fourth section 30. Thus, in first section 27 the groups consist of only a single contact each, with the result that all odd-numbered contacts are connected together and all even-numbered contacts are connected together. The 0.1 millihenry calibrated inductor 21 is connected between two successive contacts as shown. In second section 28 the groups consist of two contacts each, with the result that contacts 1, 2, 5, 6, 9, 10, 13, and 14 are connected together and contacts 3, 4, 7, 8, 11, 12, 15, and 16 are connected together. The 0.2 millihenry calibrated inductor 22 is connected between two successive groups of contacts as shown. The progression continues in similar manner through the third and fourth sections 29 and 30. In the former the groups consist of four contacts each, and in the latter they consist of eight contacts each. In each section the calibrated inductor is connected between two successive groups of contacts as shown.

Each of the switch section contact arms but the last in the illustrated embodiment of the invention is connected to the first switch position or contact of the next switch section. Thus, contact arm 31 of switch section 27 is connected to the first contact of switch section 28, contact arm 32 of switch section 28 is connected to the first contact of switch section 29, and contact arm 33 of switch section 29 is connected to the first contact of switch section 30. The first contact of switch section 27 is connected directly to external terminal 25, while contact arm 34 of the final switch section 30 is connected to external terminal 26 through a key circuit which will be described later.

The portion of the illustrated variable inductance that has already been described is adjustable in steps of 0.1 millihenry each over a range of 1.6 millihenrys with uniform accuracy in all portions of the range. Because the number of steps is restricted to sixteen, the ganged contact arms of the four switch sections may be set very quickly to an inductance within at least 0.05 millihenry of the final desired value. Additional final adjustment is, in accordance with the invention, provided by a key circuit 35 and a pair of calibrated inductors 36 and 37. Inductors 36 and 37 have inductances equal to half of the inductance of calibrated inductor 21, the smallest inductor in the main network, and are connected in series between contact arm 34 of the final switch section 30 and external terminal 26. Key circuit 35 has a three-position key, a break contact 38, and a make contact 39. When the key is in its neutral position, break contact 38 shorts out inductor 36 as shown, and only the 0.05 millihenry inductance of inductor 37 is added to the inductance of the main network. When the key is moved to the left or positive position, break contact 38 removes the short and the combined 0.1 millihenry inductance of inductors 36 and 37 is added. When the key is moved to the right or negative position, make contact 39 shorts inductors 37 and no inductance is added.

The illustrated variable inductance network is particularly well suited for use in adjusting the line building-out networks shown in FIGS. 7 and 8 of application Ser. No. 411,509, which was filed Nov. 16, 1964, by R. W. DeMonte and issued Feb. 7, 1967 as Patent 3,303,437. These networks are used in connection with negative impedance converters on non-load voice frequency transmission lines and have inductance components which need to be adjusted in the field during installation or during a subsequent alignment. The inductance components of such networks are commonly made up of several separate inductors which are permanently strapped together in series during installation or alignment to provide the required value of inductance. The present variable inductance network provides a convenient substitute for the line building-out network inductors in the field during these installation or alignment processes. The multiposition switch is quickly set to the approximate value of required inductance, using appropriate transmission measuring equipment, and key circuit 35 is used to provide the final fine adjustment. With the illustrated values of inductance, a total inductance range of from 0 to 1.6 millihenrys is available in 0.05 millihenry steps. When the correct value of inductance has been set, the variable inductance network is disconnected and the individual line building-out network inductors strapped to provide the corresponding value of inductance. The variable inductance network is, of course, suitable for many other applications as well, but use in connection with the installation of line building-out networks serves as an illustration.

It is to be understood that the above-described arrangement is illustrative of the application of the principles of the invention. Numerous other arrangements may be devised by those skilled in the art without departing from the spirit and scope of the invention.

What is claimed is:

1. An impedance network variable in steps over a range of $(2^n-1)Z$, where $n$ is an integer greater than unity and Z is the incremental unit of impedance between steps, which comprises a pair of external terminals, a multiposition switch having $n$ sections of a plurality of contacts each and a contact arm for each of said sections said contacts in each section being arranged in groups of $2^{(m-1)}$ contacts where $m$ is an integer which progresses from one through $n$ in successive sections, a first and second common means in each of said sections connecting the contacts of different alternate groups of $2^{(m-1)}$ contacts together respectively, a respective impedance element having an impedance value of $2^{(m-1)}Z$ connected between two successive groups of contacts of each of said sections, means connecting one of said external terminals to the first of said common means of the first of said sections, means connecting the contact arm of the last of said sections to the other of said external terminals, and means connecting the contact arm of each of said sections but the last to the first of said common means of the next of said sections arranged to provide the sole connection between successive sections, said contact arms being ganged together so that the impedance presented between said external terminals is dependent for its magnitude upon the setting of said contact arms upon the contacts of their respective switch sections.

2. An impedance network in accordance with claim 1 which includes a pair of auxiliary impedance elements having respective impedance values of $Z/2$ connected in series between said multiposition switch and one of said external terminals, and a three-position key connected to short neither of said auxiliary impedance elements in one position, to short one of said auxiliary impedance elements in another position, and to short both of said auxiliary impedance elements in the remaining position, thereby providing said impedance network with an effective incremental unit of impedance between steps of $Z/2$.

References Cited

UNITED STATES PATENTS

| | | | |
|---|---|---|---|
| 1,679,503 | 8/1928 | Siegrist | 336—150 |
| 3,212,038 | 10/1965 | Herrick | 336—150 X |
| 3,252,080 | 5/1966 | Newbold et al. | 323—80 X |

LARAMIE E. ASKIN, *Primary Examiner.*

D. A. TONE, *Assistant Examiner.*